United States Patent
Olsson (10) Patent No.: US 12,503,417 B2
(45) Date of Patent: Dec. 23, 2025

(54) METHOD OF PURIFYING RAW METHANOL

(71) Applicant: ANDRITZ OY, Helsinki (FI)

(72) Inventor: Johan Olsson, Svedala (SE)

(73) Assignee: ANDRITZ OY, Helsinki (FI)

( * ) Notice: Subject to any disclaimer, the term of this patent is extended or adjusted under 35 U.S.C. 154(b) by 480 days.

(21) Appl. No.: 18/014,128

(22) PCT Filed: Jun. 17, 2021

(86) PCT No.: PCT/FI2021/050464
§ 371 (c)(1),
(2) Date: Dec. 30, 2022

(87) PCT Pub. No.: WO2022/003237
PCT Pub. Date: Jan. 6, 2022

(65) Prior Publication Data
US 2023/0265031 A1    Aug. 24, 2023

(30) Foreign Application Priority Data
Jun. 30, 2020    (FI) .................................... 20205697

(51) Int. Cl.
*C07C 29/80*    (2006.01)
*C07C 29/94*    (2006.01)
*D21C 11/00*    (2006.01)

(52) U.S. Cl.
CPC .............. *C07C 29/80* (2013.01); *C07C 29/94* (2013.01); *D21C 11/0007* (2013.01)

(58) Field of Classification Search
CPC ...... C07C 29/80; C07C 29/94; D21C 11/0007
See application file for complete search history.

(56) References Cited

U.S. PATENT DOCUMENTS 8,440,159 B2    5/2013    Brucher et al.
9,394,220 B2    7/2016    Jemaa
(Continued)

FOREIGN PATENT DOCUMENTS

CA    1088957 A    * 11/1980
CL    201201711 A    6/2012
(Continued)

OTHER PUBLICATIONS

Kaggerud et al, "Chemical and Process Integration: Synergies in Co-Production of Power and Chemicals from Natural Gas with CO2 Capture," Applied Technical Engineering 26 (2006), 1345-1352 (Aug. 24, 2005)(8 pages).
(Continued)

*Primary Examiner* — Yate' K Cutliff
(74) *Attorney, Agent, or Firm* — Nixon & Vanderhye P.C.

(57) ABSTRACT

A method of purifying raw methanol obtained in chemical pulping, wherein heavy oil is admixed with the raw methanol to prevent precipitation, and the methanol mixture is distilled or evaporated to recover the methanol. The heavy oil is formed by mixing and heating raw methanol obtained from a side stream of chemical hardwood pulping with an acidic aqueous solution to vaporize low boiling point sulfurous compounds and provide acidified raw methanol. The acidified raw methanol is separated into a liquid top phase, a liquid aqueous middle phase, and a liquid bottom phase. The liquid bottom phase is extracted to obtain the heavy oil.

15 Claims, 3 Drawing Sheets

(56) References Cited

U.S. PATENT DOCUMENTS

| | | |
|---|---|---|
| 10,160,706 B2 | 12/2018 | Warnqvist |
| 2007/0299144 A1 | 12/2007 | Davey |
| 2009/0165459 A1 | 7/2009 | Henriksen |
| 2012/0100062 A1 | 4/2012 | Nakamura |

FOREIGN PATENT DOCUMENTS

| | | | |
|---|---|---|---|
| CL | 202000164 A | 1/2020 | |
| CL | 202000165 A | 1/2020 | |
| DE | 28 57 039 | 1/1994 | |
| FI | 52710 | 8/1977 | |
| GB | 2 036 826 | 7/1980 | |
| JP | 2016536290 A | 11/2016 | |
| WO | 9323132 A2 | 11/1993 | |
| WO | 2009/070110 | 6/2009 | |
| WO | WO-2009070110 A1 * | 6/2009 | ............. D21C 11/08 |
| WO | 2011087540 A2 | 7/2011 | |
| WO | 2014201555 A1 | 12/2014 | |
| WO | 2015/053704 | 4/2015 | |
| WO | WO-2015053704 A1 * | 4/2015 | ............. C07C 29/88 |
| WO | 2019020520 A1 | 1/2019 | |
| WO | 2019020522 A1 | 1/2019 | |
| WO | 2019/240654 | 12/2019 | |
| WO | 2020074094 A1 | 4/2020 | |

OTHER PUBLICATIONS

Chilean Patent Application No. 3798-2022, Search Report (Apr. 12, 2024)(30 pages)(Partial machine translation).

International Search Report for PCT/FI2021/050464, mailed Sep. 21, 2021, 2 pages.

Written Opinion of the ISA for PCT/FI2021/050464, mailed Sep. 21, 2021, 5 pages.

Notification of Reasons for Rejection, Japanese Patent Application 2022-580869 English Translation (Jun. 14, 2024)(2 pages).

Search Report and Office Action, Finnish Patent Application 20205697 (Jan. 29, 2021)(7 pages)(English Translation).

* cited by examiner

METHOD OF PURIFYING RAW METHANOL

RELATED APPLICATION

This application is the U.S. national phase of International Application PCT/FI2021/050464, filed Jun. 17, 2021, which designated the U.S. and claims priority to Finnish patent application FI 20205697, filed Jun. 30, 2020, the entire contents of each of which are hereby incorporated by reference.

TECHNICAL FIELD

The present disclosure generally relates to purifying raw methanol obtained in an industrial process. The present disclosure relates particularly, though not exclusively, to a method of purifying raw methanol obtained in chemical pulping, as well as to a use of components obtained from such raw methanol.

BACKGROUND

This section illustrates useful background information without admission of any technique described herein being representative of the state of the art.

Methanol is formed during sulphate cooking when lignin is hydrolyzed in an alkali. In addition to methanol, the cooking produces also organic sulphurous compounds, such as methyl mercaptan, dimethyl sulfide and dimethyl disulfide as the sulfide and hydrogen sulfide ions react with lignin.

During cooking, large amount of methanol ends up to the black liquor, and since methanol is quite volatile, it vaporizes together with water to the evaporator foul condensate to be recovered as raw methanol. Raw methanol is recovered also from other points of pulping process, like from the condensates of digester off gases. The foul condensate may be treated at foul condensate stripper by stripping methanol from the condensate, and afterwards the methanol can be liquefied from the stripper off gases as raw methanol in the methanol column which decreases the water content of the raw methanol.

Foul condensate contains also volatile sulphurous compounds like $H_2S$, methyl mercaptan, dimethyl sulfide that have a low boiling point, but also other less volatile sulfurous compounds. These will end up to raw methanol when treated in the stripper. In case methanol is recovered during softwood pulping while digesting spruce or pine, raw methanol contains turpentine and ammonia together with the above mentioned sulphurous compounds.

Because raw methanol obtained in chemical pulping of softwood contains a complex mixture of impurities, removal of the impurities is needed before the methanol can be used. The solubility of softwood turpentine present in the raw methanol decreases after acidification and dilution, and distinct phases can be separated by decantation. A heavier bottom phase can be collected after the acidification, while methanol and turpentine remain in the upper phase(s). Some turpentine may remain dissolved or entrained in the raw methanol. Turpentine can be removed from the raw methanol in the extraction column.

Some processes to purify the methanol from the sulphurous and other compounds have been described. For example FI52710 describes a process where methanol is treated with an acid to precipitate salts, and volatile sulphurous compounds like $H_2S$, methyl mercaptan, and dimethyl sulfide are removed as a lighter fraction, while methanol remains in the heavier bottom fraction. Furthermore, the remaining sulphurous compounds are treated with an oxidizing agent to make them more volatile and easier to separate by distillation.

Another process for methanol purification is presented at U.S. Pat. No. 8,440,159 by Metso Power AB, where ammonium is acidified by sulphuric acid and the formed salt is kept soluble below the precipitation point by diluting with water. After acidification the methanol is evaporated and treated as described in FI52710.

WO 2015/053704 by Andritz Oy describes a process where raw methanol is first acidified to vaporize $H_2S$, methyl mercaptan, and dimethyl sulfide. After this the raw methanol is washed with non-polar organic solvent to purify the methanol further. Finally water, acetone, and ethanol in the washed methanol is reduced by distillation.

A problem in purification of raw methanol stream from softwood pulping is that the precipitate formed in the acidification step of raw methanol also gets attached and grows on the equipment surfaces exposed to the acidified raw methanol. When such a precipitate is formed during the process conditions, it needs to be removed and thereby causes non-desired blockages and process interruptions.

It is an object of the present invention to provide a method for preventing precipitation when purifying raw methanol obtained as a by-product in the Kraft pulping of softwood.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

According to a first example aspect there is provided a heavy oil obtainable from a raw methanol side stream from chemical hardwood pulping, wherein the heavy oil is manufactured by a method comprising:
  an acidification step comprising mixing the raw methanol side stream with an acidic aqueous solution, and heating to vaporize low boiling point sulphurous compounds, to provide acidified raw methanol;
  a separation step comprising separating from the acidified raw methanol a liquid top phase, a liquid aqueous middle phase, and a liquid bottom phase; and
  collecting the liquid bottom phase as the heavy oil having a density of about 1010 kg/m$^3$ at 20° C.

According to a second example aspect there is provided a method for manufacturing heavy oil comprising:
  providing a raw methanol stream from hardwood pulping;
  an acidification step comprising mixing the raw methanol side stream with an acidic aqueous solution, and heating to vaporize low boiling point sulphurous compounds, to provide acidified raw methanol;
  a separation step comprising separating from the acidified raw methanol a liquid top phase, a liquid aqueous middle phase, and a liquid bottom phase; and
  collecting the bottom phase as the heavy oil having a density of about 1010 kg/m$^3$ at 20° C.

Figure 2:
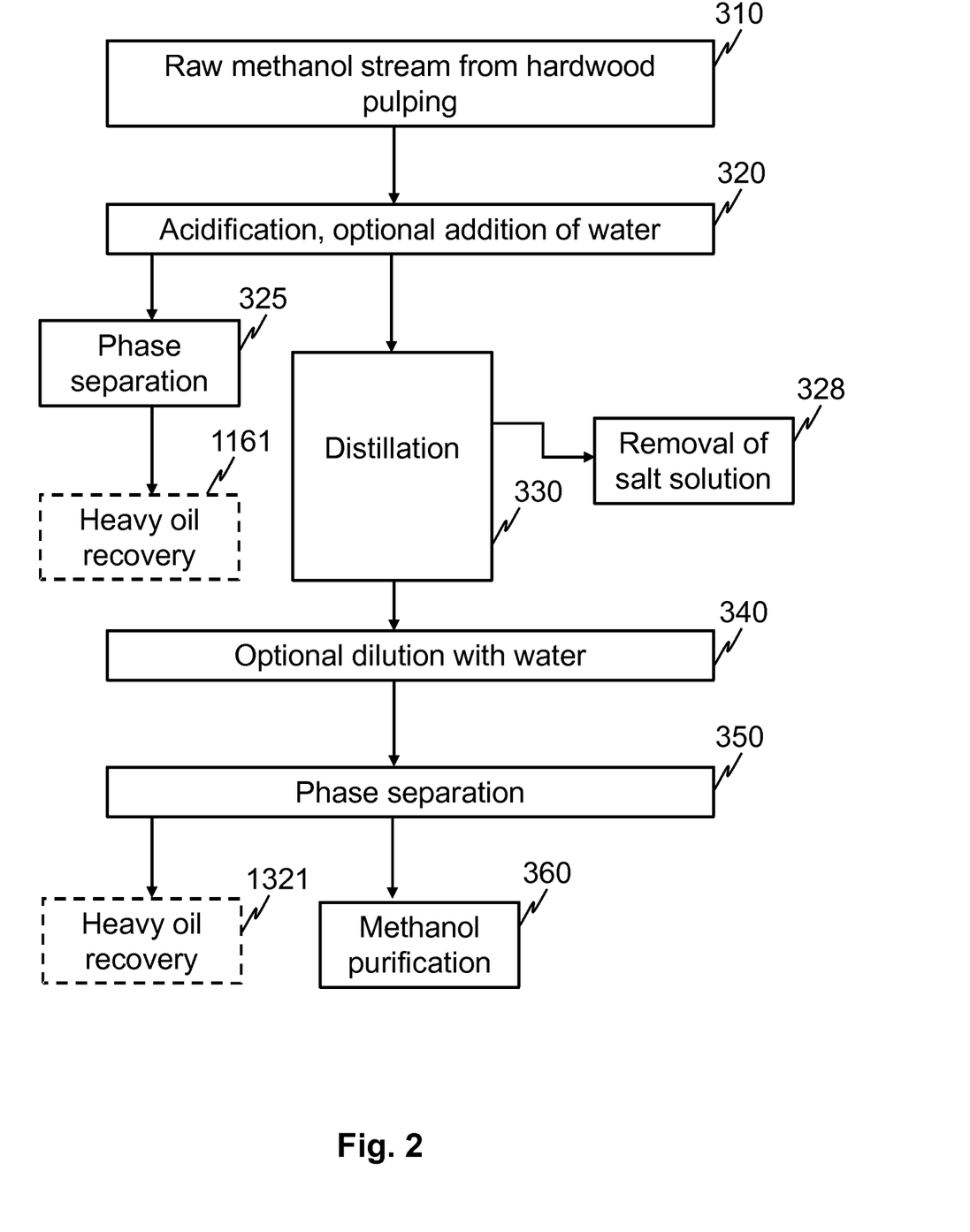
FIG. 2 shows a flow diagram of a method for producing heavy oil.

In an embodiment of the method of the second aspect, the method is for manufacturing the heavy oil of the first aspect. The method is illustrated in FIG. 2. According to a third example aspect there is provided a method of purifying raw methanol obtained in chemical pulping, the method comprising:

providing raw methanol obtained as a by-product of chemical pulping;

acidifying the raw methanol with an acidic aqueous solution to provide acidified methanol;

admixing the heavy oil to the acidified methanol to provide a methanol mixture; and distilling or evaporating the methanol mixture to recover methanol.

Figure 3:
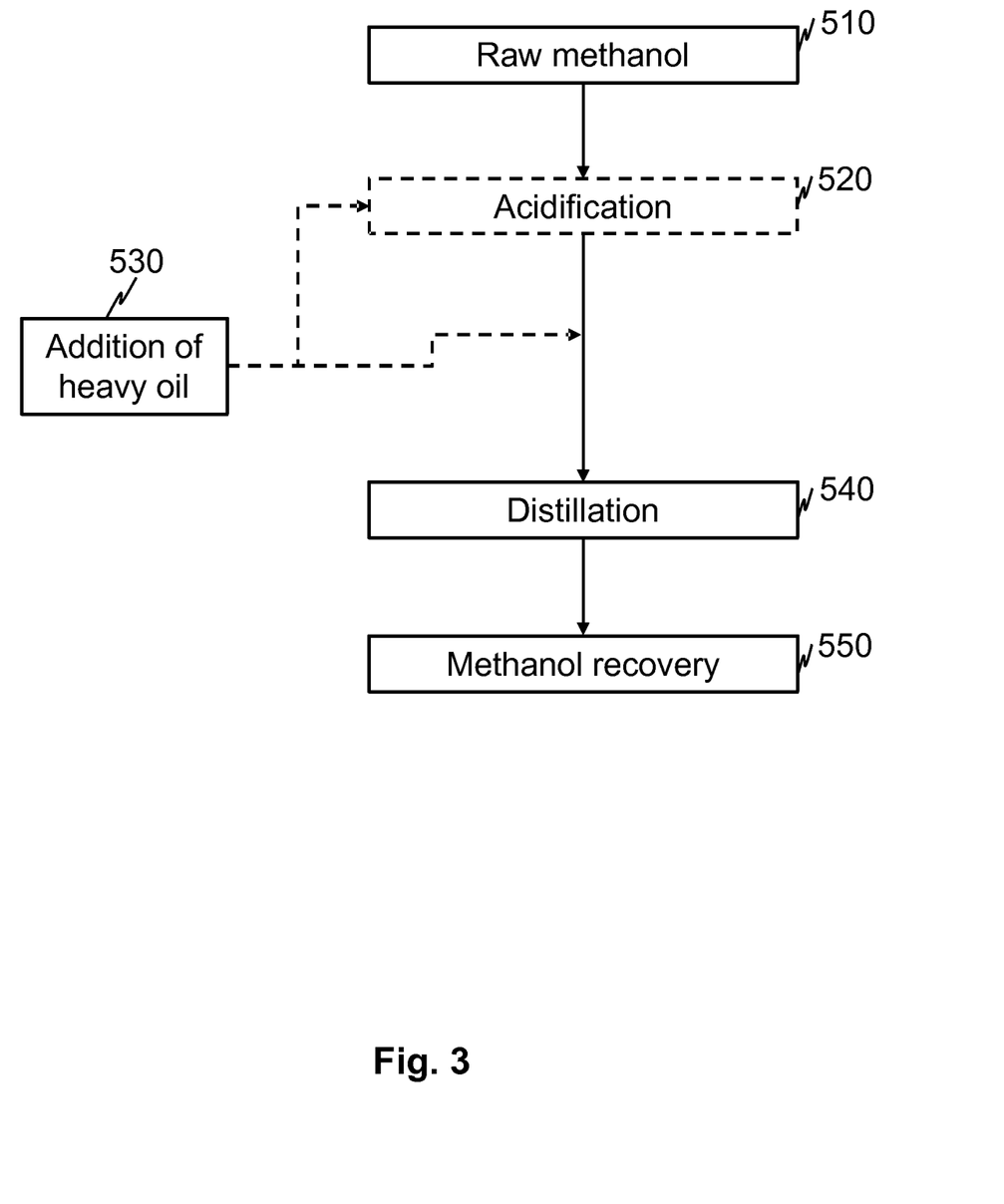
FIG. 3 shows a flow diagram of a method for purifying raw methanol according to an embodiment the present method.

In an embodiment of the third aspect the raw methanol is obtained from chemical pulping of softwood. The method of purifying raw methanol is illustrated in FIG. 3.

In another aspect is provided a use of the heavy oil in purification of raw methanol obtained in chemical pulping.

BRIEF DESCRIPTION OF THE FIGURES

Some example embodiments will be described with reference to the accompanying figures, in which.

DETAILED DESCRIPTION

In the following description, like reference signs denote like elements or steps. When softwood or hardwood is processed in chemical pulping, the resulting raw methanol, or raw methanol stream, can be processed by acidifying the raw methanol. Optionally, the raw methanol stream can also be diluted with water. The chemical composition of the raw methanol obtained from a chemical pulping process varies depending on the type of wood used in pulping, as well as the processing parameters. Therefore raw methanol stream components obtained in softwood pulping may have different characteristics, and behave in a different manner, in the acidification step, and the optional dilution step, when compared to the raw methanol stream components obtained in hardwood pulping.

Manufacturing of Heavy Oil

It has now been surprisingly found that components dissolved in the raw methanol obtained from softwood pulping tend to form after acidification a solid precipitate, and that this precipitation can be prevented by using a heavy oil obtained with the present method from a raw methanol stream from hardwood pulping.

Without being bound to any theory, it is assumed that the components found in the recovered heavy oil form during the hardwood pulping process, and some chemical conversion may additionally occur during the acidification and/or heating step. During the black liquor evaporation step of the pulping process the heavy oil components follow methanol, and during the purification process they are separated due to acidification into a distinct phase, and be collected.

Examples of heavy oils include hardwood oil, birch oil, eucalyptus oil, mixtures of said oils in any proportions, and components that can be separated from said oils and mixtures. Also examples of heavy oils include oils or compounds which have been synthesized during the acidification or heating (distillation and evaporation), and sulfurous compounds produced during cooking process.

The term heavy oil composition means a composition which comprises any amount of heavy oil or its component.

As used herein, the term "comprising" includes the broader meanings of "including", "containing", and "comprehending", as well as the narrower expressions "consisting of" and "consisting only of".

The birch oil, which is an example of heavy oil, may contain aliphatic or cyclic sulphurous compounds with 2 to 4 sulphur atoms, and have a molecular weight in the range 50-200.

In an embodiment the raw methanol stream is a sidestream from chemical pulping of softwood.

A raw methanol stream means a stream of raw methanol, such as a stream which is produced in a continuous process.

In an embodiment mixing the raw methanol with an acid forms a salt solution. The salts, such as ammonium salts, can be removed by methods known in the art, such as by settling.

In an embodiment the heavy oil has a density of about 1010 $kg/m^3$ at 20° C.

When the heavy oil is collected in the process, it has a temperature of 50-80° C. upon collection.

In an embodiment the raw methanol has a density of about 800 $kg/m^3$ at 20° C.

In an embodiment the heavy oil is enriched in organic sulphurous compounds compared to the raw methanol side stream.

Also examples of heavy oils include oils or compounds that are synthesized from the heavy oil, such as birch oil, during the acidification, heating, distillation and/or evaporation.

The amount of terpenes is increased in softwood cooking, whereas their amount in hardwood cooking is low. Typically in chemical pulping both hardwood and softwood campaigns are run, and consequently the streams, such as methanol streams, produced in these campaigns may be mixed. Thus, when analyzing e.g. the composition of hardwood methanol stream or heavy oil, the analysis results may reveal components that have formed in a previous campaign with softwood. However, the decrease in the amounts of typical softwood turpentine components in the heavy oil or raw methanol from hardwood cooking indicates that the amount of such a component is much higher in the softwood turpentine. For example the amount of terpenes is lower in heavy oil.

In particular the amount of sesquiterpenes is increased when heavy oil is manufactured according to the present process.

The GC/MS analysis can be carried out as described for the recent heavy oil from hardwood raw methanol (Niemela 2020). For the MS identifications, a commercial MS database can be used, together with an extensive collection of spectra from previous studies and published sources, including NIST Chemistry WebBook (https://webbook.nist.gov). Additional MS data searches from literature can be conducted to assist in identification of certain compounds. For comparison, a number of MS datafiles from several previous methanol analyses can be checked. Results from a chemical analysis of heavy oil and a comparison with softwood turpentine are shown in Table 1.

As the skilled person understands, the present heavy oil composition is impractical to be characterized by its exact chemical composition because it may contain hundreds of different compounds, some of which can be volatile or prone to degradation. Instead, the present disclosure characterizes the heavy oil by referring to its manufacturing method. Additional chemical and physical parameters are also used to characterize the heavy oil and differentiate it e.g. from softwood turpentine and raw methanol streams. For example the presence or absence, or a change in concentration, of a certain component of the heavy oil, compared to raw methanol stream or softwood turpentine, serves as a chemical characteristic which is an intrinsic feature of the present heavy oil. The skilled person can easily determine the presence or absence of such a feature in the heavy oil, or in another substance.

In an embodiment the heavy oil is reduced in at least one of α-pinene β-pinene, nitrogen compounds, and sulphurous and nitrogenous compounds, compared to the raw methanol.

In an embodiment the heavy oil contains at least 20% sulphurous compounds analyzed by GC/MS, preferably more than 30% sulphurous compounds analyzed by GC/MS.

In an embodiment the heavy oil contains less than 65% terpenes and at least 40% sulphurous compounds analyzed by GC/MS, preferably 1-10% terpenes and 40-50% sulphurous compounds analyzed by GC/MS.

In an embodiment the heavy oil contains 1-3.5%, preferably 1.5-2.5%, most preferably about 1.8% β-pinene analyzed by GC/MS.

In an embodiment the heavy oil comprises oils obtainable from raw methanol obtained in hardwood pulping.

In an embodiment the heavy oil is manufactured from a mixture of raw methanol from hardwood pulping and from softwood pulping. Preferably the mixture predominately contains raw methanol from hardwood pulping. However, the raw methanol from softwood pulping in said mixture does not prevent manufacturing of the heavy oil, because the present process is able to separate the heavy oil from such mixtures.

In an embodiment, when the heavy oil is used in the raw methanol purification, the heavy oil is added in amount selected from the range 0.0001-5 mass-%, preferably 0.001-5 mass-%, more preferably 0.001-4 mass-%, and most preferably 0.001-1 mass, based on the total mass of the methanol mixture.

Figure 1:
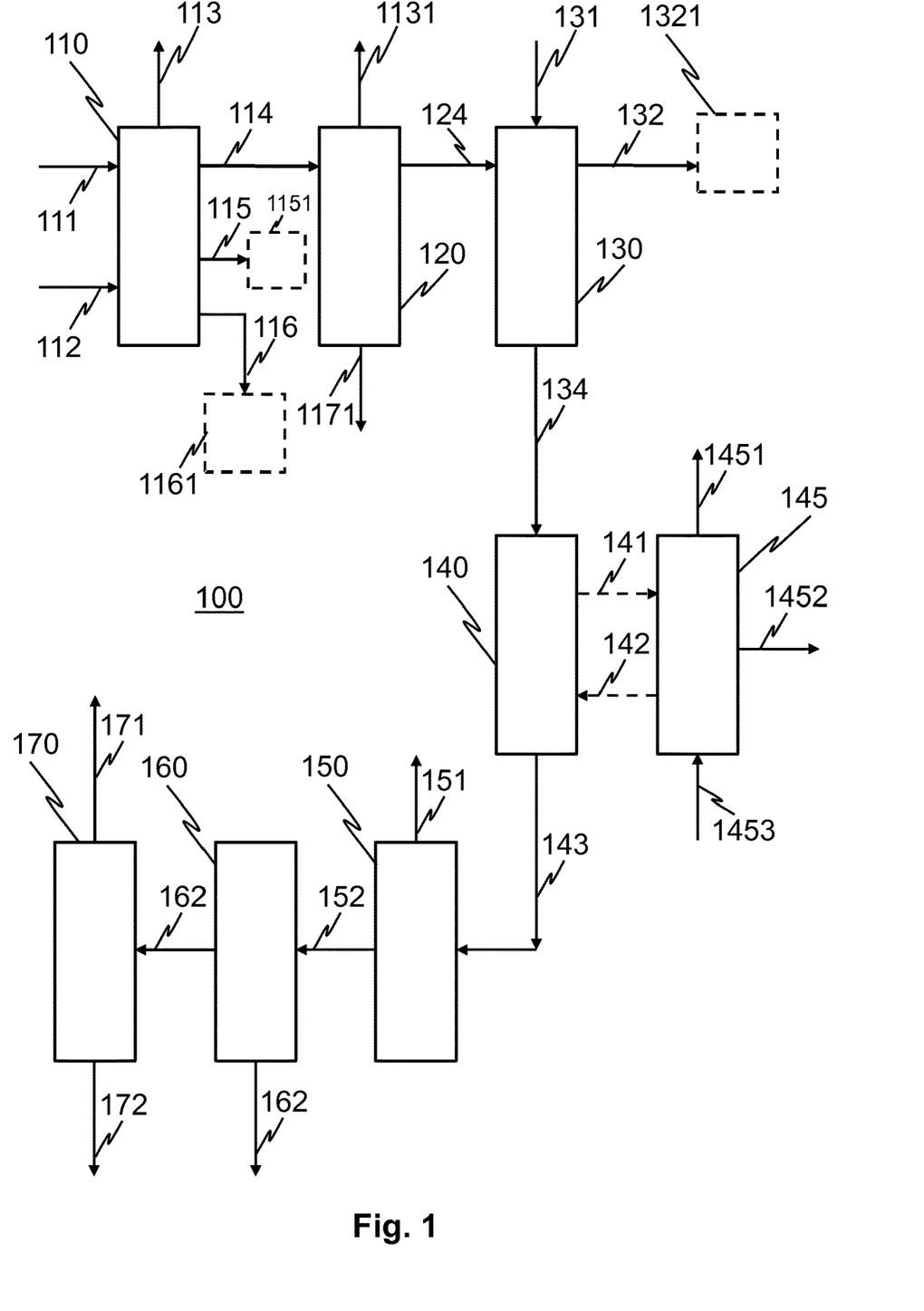
FIG. 1 shows an embodiment of a system for producing heavy oil.

FIG. 1 shows an embodiment of a system for producing heavy oil. The relevant elements of the system 100 are described below in detail with a reference to the corresponding method for producing heavy oil as described in FIG. 2.

The system 100 has an acidification unit 110, to which raw methanol stream(s) from hardwood pulping 111 is fed. Acid stream 112 is fed to the acidification unit 110 to acidify the raw methanol in the acidification unit 110. The acidification of the raw methanol stream(s) 111 is also shown in FIG. 2 as the acidification step 320 including an optional addition of water.

Volatiles 113 are optionally removed from the acidification unit 110. Optionally, turpentine 115 is also removed and conducted to a turpentine recovery unit 1151.

Heavy oil 116 can optionally be recovered to a heavy oil recovery unit 1161 from the acidification unit, which can also be used to separate liquid phases after acidification. As the acidification of the raw methanol stream in the acidification unit 110 results into separation of an aqueous salt solution, salts such as ammonium salts can be removed. Further, phase separation 325 occurs in the acidification unit 110 as shown in FIG. 2, and heavy oil can be recovered 1161 as the bottom phase after settling of the liquid phases. A lighter methanol containing phase forms above the liquid bottom phase as an acidified raw methanol stream 114.

The acidified raw methanol stream 114 is fed into a distillation unit 120 to separate volatiles 1131 by distillation 330. Optionally, a salt solution comprising ammonium sulfate 1171 formed during distillation is removed, as shown in FIG. 2 as the step 328.

From the distillation unit 120 the raw methanol distillate 124 is fed into a buffer tank 130 to which water 131 is optionally fed. Upon addition of water 131, the raw methanol distillate 124 is diluted as also shown in FIG. 2 as the step 340. Dilution 340 results into phase separation of liquid phases (step 350 in FIG. 2), from which heavy oil 132 can be recovered into the heavy oil recovery unit 1321, and methanol purification 360 can be continued by feeding the raw methanol and water feed 134 to an extraction column 140.

The optional addition of water is advantageous to prevent ammonium sulphate from precipitation as the methanol reduces its solubility. The chemical composition of the raw methanol may vary in industrial processes, and the optional addition of water can be used to optimize the process for cases when the concentration of ammonium sulfate rises above its solubility level.

From the extraction column 140 a feed 141 is optionally fed to an optional solvent stripping unit 145 to which steam 1453 can be fed. Gaseous feed 1451 is conducted to rich gas system, and a condensate 1452 containing water is removed. Feed 142 containing aliphatic paraffinic oil can be returned to the extraction column.

From the extraction column a feed 143 containing methanol, ethanol, acetone and water is conducted to a series of distillation columns 150, 160, 170, in which acetone and volatile impurities 151 are initially removed from methanol, ethanol and water feed 152 in the distillation column 150, then water 162 is separated from methanol and ethanol feed in the distillation column 160, and a methanol feed 171 is separated from less volatile impurities such as propanol, butanol and ethanol feed 172 in the distillation column 170.

FIG. 2 shows a flow diagram of the heavy oil manufacturing. Briefly, raw methanol stream from hardwood pulping is provided 310, and acidified 320 with an optional addition of water. When adding the acid 320 there may be an evaporation of methyl mercaptane (MM) and $H_2S$. In the existing process also dimethyl sulfide (DMS) is removed together with MM and $H_2S$ in a distillation column ("Sulphur column"). Salt is removed as a salt solution 328, and distinct liquid phases separate 325. A heavy bottom phase containing heavy oil is recovered 1161, and the acidified raw methanol stream is distilled 330 and the resulting distillate is optionally diluted 340 with water, which results into separation of liquid phases 350. A heavy bottom phase containing heavy oil is recovered 1321 and a lighter methanol containing phase is taken to methanol purification 360. The methanol purification step 360 comprises collectively the steps carried out downstream of the buffer tank 130 in FIG. 1.

In an embodiment the acidification step 320 is carried out by using a strong acid in aqueous solution, preferably 10-98 wt-% $H_2SO_4$. Optionally, water is added. Addition of water is advantageous in particular when using strong acid, such as 98 wt-% $H_2SO_4$. The acidification results into formation of ammonium salts.

In an embodiment in the method for manufacturing heavy oil, as shown in FIG. 2, the raw methanol side stream contains less than 50% terpenes and less than 20% sulphurous compounds analyzed by GC/MS, preferably less than 45% terpenes and less than 15% sulphurous compounds analyzed by GC/MS.

In an embodiment the method for making heavy oil, as shown in FIG. 2, further comprises distilling the middle phase, optionally diluting the resulting distillate with water to separate phases, and recovering a heavy bottom phase containing heavy oil 1321. Thus, recovery of heavy oil can be further enhanced by collecting the heavy oil after the distillation step 330.

In a further embodiment heavy oil is recovered only after distillation, i.e. the first recovery step before distillation 1161 is omitted, and only the recovery point 1321 is employed.

Raw Methanol Purification

Precipitate formation in raw methanol from softwood pulping is accelerated at low pH below 5 indicating it being an acid catalyzed reaction. Precipitate formation is further accelerated by a temperature higher than 50° C. Acidification of the raw methanol stream is also used to vaporize volatile sulphurous compounds and to keep $NH_3$ in solution.

Precipitate formation in raw methanol can be prevented by adding the present heavy oil.

In an alternative or additional embodiment the heavy oil is added to the raw methanol from softwood pulping before the methanol purification process is started, such as during or after the methanol recovery from the foul condensate stripper (not shown in FIG. 3).

In another embodiment the heavy oil is mixed together with the raw methanol after the acid has been mixed but before the distillation, as shown with the dashed lines in FIG. 3. In case the raw methanol is diluted with water, heavy oil can be added before or after water is added. In a preferred embodiment the heavy oil is added after turpentine separation, to ensure that the heavy oil is not dissolved in the turpentine.

The acidification step can be followed by heating to evaporate volatiles, such as $H_2S$, mercaptane and dimethyl sulfide, from the methanol-containing phase which is subsequently recovered as a distillated form the distillation column(s).

In a preferred embodiment the raw methanol purification method comprises distillation and evaporation by using a multi-stage distillation and evaporation process comprising a series of distillation columns. In such a process heavy oil can be added to the methanol containing feed before a distillation or evaporation step is started. The heavy oil can thus be added at least once before the multi-stage distillation process is started, it can be added before each individual distillation step is started in the series of distillation columns, or it can be added before a certain distillation step is started.

The precipitations are mainly formed when the methanol is evaporated/distilled from the salt solution. When the methanol content becomes low during evaporation/distillation, the temperature increases and the solubility of precipitating compounds decreases. In a preferred embodiment the heavy oil is added or fed just before this step, i.e. before temperature begins to increase as a result of decreased methanol content.

When heavy oil is added before a distillation or evaporation step is started, its dosage can be selected from the range 0.5-50 L/day.

In a preferable embodiment the first distillation column is configured to separate water with dissolved $(NH_4)_2SO_4$.

In a preferable embodiment the second distillation column is configured to separate compounds that are more volatile than methanol, such as acetone.

In a preferable embodiment the third distillation column is configured to separate water.

In a preferable embodiment the fourth distillation column is configured to separate compounds that are less volatile than methanol, such as ethanol.

As shown in the examples below, when heavy oil was added to the raw methanol stream obtained from softwood pulping, the resulting raw methanol mixture remains clear, and during distillation no precipitation formation was observed. Thus, distillation could be carried out directly to the raw methanol mixture without further steps to remove a precipitate. Typically, when using prior art purification processes for purifying raw methanol by distillation, precipitate is seen in the distillation columns and in the raw methanol liquor, and the precipitate has to be removed before distillation.

FIG. 3 shows in a flow diagram an overview of the present method for purifying raw methanol by using the heavy oil. In step 510 raw methanol is provided, and heavy oil is added 530 before the distillation step 540. After obtaining a methanol mixture with the added heavy oil, the methanol mixture is distilled in step 540, and methanol is recovered in step 550.

In a preferred embodiment the addition of heavy oil is controlled such that no significant phase separation occurs when it is mixed with the acidified raw methanol. This has an advantage of enhancing the capability of heavy oil to prevent precipitation.

In FIG. 3 an optional acidification step 520 is shown as a dashed box, and when this step is employed, heavy oil is added to the acidified raw methanol before or after the acidification step 520, as shown with the arrows having dashed lines. In this embodiment either or both of the addition points can be employed. Preferably heavy oil is added after acidification.

With the present process involving use of heavy oil, the methanol purification process is simplified as the raw methanol mixture containing heavy oil can directly be distilled.

In an embodiment the raw methanol stream 510 mainly comprises methanol, wood extractives, sulphurous compounds and optionally nitrogenous compounds. The amounts of these components may vary depending on the type of wood used in pulping, as well as the process parameters of the pulping. Typically the amount of water, wood extractives, sulfurous compounds and nitrogenous compounds are in the range 15-30 mass-% in raw methanol from softwood pulping.

The methanol content of the raw methanol from softwood pulping is in the range 70-85 mass-%.

In an embodiment the wood extractives present in the raw methanol comprise terpenes, preferably monoterpenes and sesquiterpenes.

The raw methanol stream may also contain sulphurous compounds and nitrogenous compounds. Sulphur compounds and sulfurous compounds refer to organic compounds containing at least one sulphurous atom as a heteroatom but no nitrogen. Nitrogenous compounds and nitrogen compounds refer to organic compounds containing at least one nitrogen atom as a heteroatom but no sulphur. Sulphur and nitrogen compounds refers to organic compounds that contain at least one sulphur and at least one nitrogen atom as heteroatoms.

In an embodiment the raw methanol is obtained from chemical pulping of softwood, hardwood or a mixture thereof. In a preferred embodiment the raw methanol comprises raw methanol from chemical pulping of softwood.

In another embodiment the heavy oil does not contain nitrogenous compounds, such as pyrrole and amines, that are typically present in raw methanol obtained in pulping of softwood.

In an embodiment the methanol mixture is a one-phase solution, a dispersion or a two-phase mixture. In a two-phase system the phases can be dispersed or not dispersed, and raw methanol is mainly in one phase, but it may contain some dispersion (not necessary visible). However, as the raw methanol is acidified or/and water is added, then the solubility of for example terpenes are reduced and they form more clear dispersion. In a preferred embodiment the methanol mixture is a one-phase solution. The solubility of terpenes is reduced by adding dilution water. In an embodiment only strong acid is added, and the acid will be consumed by forming a white ammonium salt precipitation.

Preferably no precipitate is seen in the methanol mixture after addition of heavy oil.

In an embodiment the raw methanol is acidified before distilling or evaporating to a pH value below 7, preferably acidified to a pH value below 5. In another embodiment the methanol mixture is immediately distilled after acidification, i.e. no precipitation needs to be removed and no decanting or settling of phases is needed before the methanol mixture can be distilled.

In an embodiment light turpentine phase is removed before distillation.

In an embodiment the heavy oil is added to the raw methanol before distillation or evaporation.

In an embodiment the heavy oil is added to the raw methanol after acidification.

In an embodiment ammonium sulphate is removed as a solution. As salts such as ammonium salts remain dissolved during evaporation and/or distillation, they can be easily removed as a bottom product.

In an embodiment the heavy oil is added in amount selected from the range 0.0001-5 mass-%, preferably 0.001-5 mass-%, more preferably 0.001-4 mass-%, and most preferably 0.001-1 mass-%, based on the total mass of the methanol mixture. In case a plurality of distillation columns are used in a series, said amount can be added before the first, at least one, some, or each of the distillation columns.

In an embodiment of the method the methanol is recovered by distillation by using a plurality of distillation columns in a series.

In an embodiment the raw methanol stream 510 is obtained from chemical pulping of softwood or hardwood, or a mixture thereof. Raw methanol obtained from softwood pulping is particularly advantageous in the present invention.

In an embodiment the raw methanol is acidified before distilling or evaporating. Preferably the acidified raw methanol is distilled or evaporated without a precipitate removal step, and/or a decanting step.

In an embodiment in softwood raw methanol purification a turpentine fraction is removed after dilution water is added. In an embodiment the turpentine content is about 10% in the raw methanol from softwood. Without dilution water the turpentine remains dissolved and then follow the methanol to the extraction column.

In an embodiment the methanol mixture obtained after addition of heavy oil is clear, or essentially clear. Clarity of the methanol mixture can be verified e.g. simply by visual inspection.

As is clear to the skilled person, the method illustrated in FIGS. 2 and 3 can be modified to further control or improve certain steps of the method or products obtained with it. For example products obtained with the method can be taken to further purification, separation, derivatization or to at least one chemical conversion step to separate components present in the product, or to chemically convert them into further products.

EXAMPLES

The following experiments were performed to compare the performance of the present raw methanol purification method with a method conducted according to prior art.

Manufacturing of Heavy Oil

The analysis results of the heavy oil are summarized in Table 1. As the results show, the present heavy oil is characterized by an unusually high amount of sulfurous compounds. Also the amount of sesquiterpenes is high, and clearly different compared to e.g. softwood turpentine.

TABLE 1

Chemical analysis of heavy oil and softwood turpentine.

| Name | Concentration w-% | Name | Concentration w-% |
|---|---|---|---|
| Heavy Oil | | | |
| α-Pinene | 4.5 | Methyl mercaptan | 0.3 |
| Fenchene | 0.3 | 1-(Methylthio)ethanethiol | 2.1 |
| Camphene | 1.1 | Ethyl methyl disulphide | 0.2 |
| β-Pinene | 0.1 | Diethyl disulphide | 0.6 |
| 3-Carene | 23.6 | 1,1-bis(Methylthio)ethane | 5 |
| α-Terpinene | 0.9 | 1,2-bis(Methylthio)ethane | 0.7 |
| Limonene | 5.9 | 3,5-Dimethyl-1,2,4-trithiolanes (2) | 4 |
| γ-Terpinene | 1.3 | 2,4,6-Trimethyl-1,3,5-trithianes (2) | 1.6 |
| α-Terpinolene | 7.3 | Sulphur compound (peak 20) | 4.4 |
| Borneol | 0.4 | Sulphur compound (peak 22) | 2.9 |
| α-Terpineol | 2 | Other (unknown) sulphur compounds | 9.6 |
| p-Cymene | 1 | Other compounds | 7.3 |
| Other monoterpenes | 1.8 | | |
| Sesquiterpenes | 11.1 | | |
| Terpenes | 61.3 | Sulphurous compounds | 31.4 |
| Softwood turpentine | | | |
| α-Pinene | 48.2 | Methyl mercaptan | 2.2 |
| Fenchene | — | Dimethyl sulphide | 3.4 |
| Camphene | 0.6 | Dimethyl disulphide | 0.3 |
| β-Pinene | 6 | | |
| 3-Carene | 21.2 | | |
| α-Terpinene | — | | |
| Limonene | 3.1 | | |
| γ-Terpinene | 0.3 | | |
| α-Terpinolene | — | | |

TABLE 1-continued

Chemical analysis of heavy oil and softwood turpentine.

| Name | Concentration w-% | Name | Concentration w-% |
| --- | --- | --- | --- |
| Borneol | — | | |
| α-Terpineol | 2 | | |
| p-Cymene | 0.3 | | |
| Other monoterpenes | — | | |
| Sesquiterpenes | — | | |
| Terpenes | 81.7 | Sulphurous compounds | 5.9 |

Comparative Example 1

In a 500 mL glass cylinder a 300 mL of acidified raw methanol from softwood pulping and containing ammonium sulphate in water was boiled in the atm pressure to simulate the conditions at the first distillation column after methanol acidification. During the methanol water boiling it was noticed that a solid precipitate was formed, similarly as described in previous publications in connection with methanol purification processes. Solid precipitate was not dissolvable to the common solvents tested, like acetone, sulfuric acid, hydrochloric acid, paraffinic oil, or NaOH.

Example 2

This test was started as in the Comparative example 1 using raw methanol sample from softwood pulping. Before heating and boiling, 1 g of heavy oil (birch oil) was added. During boiling and methanol evaporation no precipitation was noticed. The heavy oil thus prevented precipitation.

Additionally, it was found that the heavy oil is able to dissolve the solid precipitation formed in the Comparative example 1. A seriously contaminated distillation column that was used to purify raw methanol from a softwood campaign could be cleaned with raw methanol containing the heavy oil: after a couple of days with hardwood raw methanol most of the liquid exposed parts in the column were nearly clean. The addition of heavy oil thus effectively prevented precipitation and even dissolved a previously formed precipitation.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A method to form a heavy oil from a raw methanol side stream from chemical hardwood pulping, wherein the method comprises:
an acidification step comprising mixing the raw methanol side stream with an acidic aqueous solution, and heating the raw methanol mixed in the aqueous solution to vaporize low boiling point sulfurous compounds and provide acidified raw methanol;
a separation step comprising separating from the acidified raw methanol a liquid top phase, a liquid aqueous middle phase, and a liquid bottom phase; and
collecting the liquid bottom phase as the heavy oil having a density of about 1010 kg/m$^3$ at 20° C.

2. The heavy oil of claim 1, wherein the heavy oil is enriched in organic sulfurous compounds compared to the raw methanol side stream.

3. The heavy oil of claim 1, wherein the heavy oil contains at least 20% sulfurous compounds analyzed by GC/MS.

4. A method comprising:
providing a raw methanol side stream from hardwood pulping;
an acidification step comprising mixing the raw methanol side stream with an acidic aqueous solution, and heating to vaporize low boiling point sulfurous compounds, to provide acidified raw methanol;
a separation step comprising separating from the acidified raw methanol a liquid top phase, a liquid aqueous middle phase, and a liquid bottom phase; and
collecting the bottom phase as a heavy oil having a density greater than a density of the raw methanol side stream.

5. The method of claim 4, wherein the raw methanol side stream contains less than 50% terpenes and less than 20% sulfurous compounds analyzed by GC/MS.

6. A method of purifying raw methanol obtained in chemical pulping, the method comprising:
providing raw methanol obtained as a by-product of chemical pulping;
acidifying the raw methanol with an acidic aqueous solution to provide acidified methanol;
admixing a heavy oil having a density of about 1010 kg/m$^3$ with the acidified methanol to provide a methanol mixture; and
distilling or evaporating the methanol mixture to recover methanol.

7. The method of claim 6, wherein the raw methanol comprises methanol, wood extractives, sulfurous compounds and optionally nitrogenous compounds.

8. The method of claim 6, wherein the raw methanol is obtained from chemical pulping of softwood, hardwood or a mixture thereof.

9. The method of claim 6, wherein the methanol mixture is a one-phase solution, a dispersion or a two-phase mixture.

10. The method of claim 6, wherein the methanol mixture is a two-phase system having a liquid top phase and a liquid bottom phase, wherein the bottom phase contains ammonium sulphate, and wherein the bottom phase is at least partially removed before distillation or evaporation.

11. The method of claim 6, wherein the raw methanol is acidified before distilling or evaporating to a pH value below 7.

12. The method of claim 6, wherein the heavy oil is added to the raw methanol before distillation or evaporation.

13. The method of claim 6, wherein the heavy oil is added in amount selected from the range 0.0001-5 mass-% based on the total mass of the methanol mixture.

14. The method of claim 4, further comprising:
    mixing the heavy oil with the acidified methanol to produce a methanol mixture, and
    distilling or evaporating the methanol mixture to recover methanol.

15. The method of claim 4, wherein the density of the heavy oil is about 1010 kg/m$^3$ at 20° C.

* * * * *